(12) United States Patent
Pei et al.

(10) Patent No.: US 11,564,182 B2
(45) Date of Patent: Jan. 24, 2023

(54) METHOD AND APPARATUS FOR POWER CONTROL

(71) Applicant: Telefonaktiebolaget LM Ericsson (publ), Stockholm (SE)

(72) Inventors: Yali Pei, Beijing (CN); Yuan Wang, Beijing (CN); Torbjörn Wigren, Uppsala (SE); Björn Thors, Rättvik (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/283,600

(22) PCT Filed: Oct. 9, 2018

(86) PCT No.: PCT/CN2018/109436
§ 371 (c)(1),
(2) Date: Apr. 8, 2021

(87) PCT Pub. No.: WO2020/073191
PCT Pub. Date: Apr. 16, 2020

(65) Prior Publication Data
US 2021/0385764 A1  Dec. 9, 2021

(51) Int. Cl.
*H04W 52/42* (2009.01)
*H04B 7/0456* (2017.01)
*H04W 52/36* (2009.01)

(52) U.S. Cl.
CPC .......... *H04W 52/42* (2013.01); *H04B 7/0456* (2013.01); *H04W 52/367* (2013.01)

(58) Field of Classification Search
CPC .. H04B 7/0617; H04B 7/0413; H04B 7/0634; H04L 25/0204
(Continued)

(56) References Cited

U.S. PATENT DOCUMENTS

| 2003/0171131 A1 | 9/2003 | Kettering et al. |
| 2010/0103810 A1 | 4/2010 | Kloos et al. |

(Continued)

FOREIGN PATENT DOCUMENTS

| CN | 1116024 A | 1/1996 |
| CN | 1454322 A | 11/2003 |

(Continued)

OTHER PUBLICATIONS

EPO Communication with Supplementary European Search Report dated May 13, 2022 for Patent Application No. 18936473.0, consisting of 8-pages.

*Primary Examiner* — Sam K Ahn
*Assistant Examiner* — Gina M McKie
(74) *Attorney, Agent, or Firm* — Christopher & Weisberg, P.A.

(57) ABSTRACT

Disclosed are methods and apparatuses. The method implemented at a wireless device may comprise computing an average power for a bin covering a portion of a total solid angle covered by an antenna array of the wireless device by averaging a momentary power for the bin over a time period, wherein the momentary power is computed based on respective scheduled power of at least one beamforming transmission and respective antenna gain of the at least one beamforming transmission in the bin (302, 606, 702, 802, 902, 1002). The method may further comprise performing a back-off power feedback control for the bin based on the computed average power (304, 608, 708, 808, 908, 1006).

17 Claims, 17 Drawing Sheets

(58) Field of Classification Search
USPC .......................................................... 375/267
See application file for complete search history.

(56) References Cited

U.S. PATENT DOCUMENTS

| | | |
|---|---|---|
| 2015/0085761 A1 | 3/2015 | Maltsev et al. |
| 2016/0043465 A1* | 2/2016 | McDevitt ................ G01S 13/91 |
| | | 342/368 |
| 2016/0098053 A1* | 4/2016 | Khawand ............ H04W 52/362 |
| | | 307/116 |
| 2018/0323843 A1* | 11/2018 | Li ........................ H04B 7/0639 |
| 2019/0200365 A1* | 6/2019 | Sampath ............... H04W 24/10 |

FOREIGN PATENT DOCUMENTS

| CN | 102546508 A | 7/2012 |
|---|---|---|
| CN | 103916174 A | 7/2014 |
| CN | 107623558 A | 1/2018 |

* cited by examiner

300 ⟶

302

Computing an average power for a bin covering a portion of a total solid angle covered by an antenna array of the wireless device by averaging a momentary power for the bin over a time period, wherein the momentary power is computed based on respective scheduled power of at least one beamforming transmission and respective antenna gain of the at least one beamforming transmission in the bin

304

Performing a back-off power feedback control for the bin based on the computed average power

FIG. 3

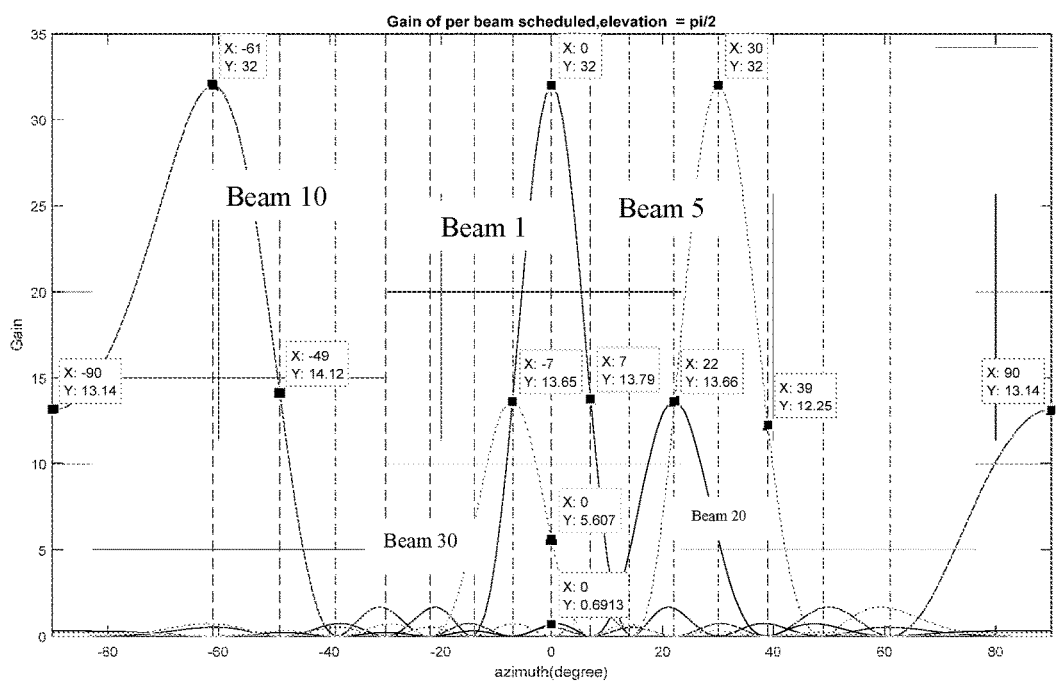

602
Generating respective beamforming weight for the at least one beamforming transmission by using codebook based beamforming or by using a solution to a reciprocity assisted transmission (RAT) optimization problem

604
Obtaining the respective antenna gain in the bin based on the respective beamforming weight

606
Computing an average power for a bin covering a portion of a total solid angle covered by an antenna array of the wireless device by averaging a momentary power for the bin over a time period, wherein the momentary power is computed based on respective scheduled power of at least one beamforming transmission and respective antenna gain of the at least one beamforming transmission in the bin

608
Performing a back-off power feedback control for the bin based on the computed average power

Computing an average power for a bin covering a portion of a total solid angle covered by an antenna array of the wireless device by averaging a momentary power for the bin over a time period, wherein the momentary power is computed based on respective scheduled power of at least one beamforming transmission and respective antenna gain of the at least one beamforming transmission in the bin

704

Obtaining an estimated normalized power for the bin by normalizing the computed average power with a total max transmit power and a maximum beam gain

706

Obtaining a total power for the bin by multiplying the estimated normalized power with a total power measured at at least one power amplifier in a radio of the wireless device, wherein the obtained total power for the bin is used for the back-off power feedback control for the bin

708

Performing a back-off power feedback control for the bin based on the computed average power

```
                                                    ┌ 802
┌─────────────────────────────────────────────────────────┐
│ Computing an average power for a bin covering a portion  │
│ of a total solid angle covered by an antenna array of    │
│ the wireless device by averaging a momentary power for   │
│ the bin over a time period, wherein the momentary power  │
│ is computed based on respective scheduled power of at    │
│ least one beamforming transmission and respective        │
│ antenna gain of the at least one beamforming             │
│ transmission in the bin                                  │
└─────────────────────────────────────────────────────────┘
                            │
                                                    ┌ 804
┌─────────────────────────────────────────────────────────┐
│ Turning on the back-off power feedback control for the   │
│ bin when the computed average power is greater than a    │
│ first threshold                                          │
└─────────────────────────────────────────────────────────┘
                            │
                                                    ┌ 806
┌─────────────────────────────────────────────────────────┐
│ Turning off the back-off power feedback control for the  │
│ bin and setting a resource threshold for the bin applied │
│ in a scheduler as the maximum value when the computed    │
│ average power is smaller than a second threshold,        │
│ wherein the first threshold is greater than the second   │
│ threshold                                                │
└─────────────────────────────────────────────────────────┘
                            │
                                                    ┌ 808
┌─────────────────────────────────────────────────────────┐
│ Performing a back-off power feedback control for the bin │
│ based on the computed average power                      │
└─────────────────────────────────────────────────────────┘
```

Computing an average power for a bin covering a portion of a total solid angle covered by an antenna array of the wireless device by averaging a momentary power for the bin over a time period, wherein the momentary power is computed based on respective scheduled power of at least one beamforming transmission and respective antenna gain of the at least one beamforming transmission in the bin

904

Performing a back-off power feedback control for the bin based on the computed average power

904-2

Only allowing a differential control action that reduces the power of the bin

Computing an average power for a bin covering a portion of a total solid angle covered by an antenna array of the wireless device by averaging a momentary power for the bin over a time period, wherein the momentary power is computed based on respective scheduled power of at least one beamforming transmission and respective antenna gain of the at least one beamforming transmission in the bin

1004

When the computed average power is greater than a fraction of a determined maximum averaged power threshold to meet certain regulatory requirements, setting a resource threshold for the bin applied in a scheduler as minimum value

1006

Performing a back-off power feedback control for the bin based on the computed average power

FIG. 10

METHOD AND APPARATUS FOR POWER CONTROL

TECHNICAL FIELD

The non-limiting and exemplary embodiments of the present disclosure generally relate to the technical field of communications, and specifically to methods and apparatuses for power control.

BACKGROUND

This section introduces aspects that may facilitate a better understanding of the disclosure. Accordingly, the statements of this section are to be read in this light and are not to be understood as admissions about what is in the prior art or what is not in the prior art.

When a radio equipment is to be deployed, regulatory radio frequency (RF) electromagnetic field (EMF) exposure requirements need to be accounted for. These RF EMF exposure regulations may typically be based on international guidelines and standards from for example the International Commission on Non-Ionizing Radiation Protection (IC-NIRP) but may take different forms in some countries and regions. An aim of the RF EMF exposure regulations is to secure that the human exposure to RF energy is kept within prescribed limits, which typically have been set with wide safety margins.

SUMMARY

In a first aspect of the disclosure, there is provided a method implemented at a wireless device. The method may comprise computing an average power for a bin covering a portion of a total solid angle covered by an antenna array of the wireless device by averaging a momentary power for the bin over a time period, wherein the momentary power is computed based on respective scheduled power of at least one beamforming transmission and respective antenna gain of the at least one beamforming transmission in the bin. The method may further comprise performing a back-off power feedback control for the bin based on the computed average power.

In a second aspect of the disclosure, there is provided an apparatus implemented at a wireless device. The apparatus may comprise a processor; and a memory coupled to the processor, said memory containing instructions executable by said processor, whereby said apparatus is operative to compute an average power for a bin covering a portion of a total solid angle covered by an antenna array of the wireless device by averaging a momentary power for the bin over a time period, wherein the momentary power is computed based on respective scheduled power of at least one beamforming transmission and respective antenna gain of the at least one beamforming transmission in the bin. Said apparatus is operative to perform a back-off power feedback control for the bin based on the computed average power.

In a third aspect of the disclosure, there is provided a computer program product, comprising instructions which, when executed on at least one processor, cause the at least one processor to carry out the method according to the first aspect of the disclosure.

In a fourth aspect of the disclosure, there is provided a computer-readable storage medium storing instructions which when executed by at least one processor, cause the at least one processor to carry out the method according to the first aspect of the disclosure.

In a fifth aspect of the disclosure, there is provided an apparatus implemented at a wireless device. The apparatus may comprise a computing unit configured to compute an average power for a bin covering a portion of a total solid angle covered by an antenna array of the wireless device by averaging a momentary power for the bin over a time period, wherein the momentary power is computed based on respective scheduled power of at least one beamforming transmission and respective antenna gain of the at least one beamforming transmission in the bin. The apparatus may further comprise a performing unit configured to perform a back-off power feedback control for the bin based on the computed average power.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 3 shows a flowchart of a method according to an embodiment of the present disclosure;

FIG. 4 shows antenna gains corresponding to each of the used codebook indices;

FIG. 6 shows a flowchart of a method according to an embodiment of the present disclosure;

FIG. 7 shows a flowchart of a method according to another embodiment of the present disclosure;

FIG. 8 shows a flowchart of a method according to another embodiment of the present disclosure;

FIG. 9 shows a flowchart of a method according to another embodiment of the present disclosure;

FIG. 10 shows a flowchart of a method according to another embodiment of the present disclosure;

DETAILED DESCRIPTION

Figure 1:
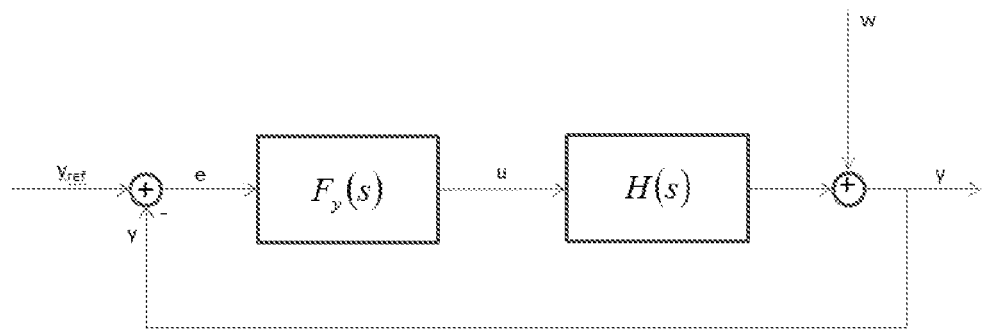
FIG. 1 schematically shows a block diagram of a feedback control loop.

For the purpose of explanation, details are set forth in the following description in order to provide a thorough understanding of the embodiments disclosed. It is apparent, however, to those skilled in the art that the embodiments may be implemented without these specific details or with an equivalent arrangement.

As used herein, the term "communication network" refers to a network following any suitable communication standards, such as new radio (NR), long term evolution (LTE), LTE-Advanced, and so on. Furthermore, the communications between a terminal device and a network node in the communication network may be performed according to any suitable generation communication protocols, including, but not limited to the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "user equipment (UE)" refers to any end device that can access a wireless communication network and receive services therefrom. By way of example and not limitation, the UE refers to a mobile terminal, a terminal device, or other suitable devices. The UE may be, for example, a Subscriber Station (SS), a Portable Subscriber Station, a Mobile Station (MS), or an Access Terminal (AT). The UE may include, but not limited to, a portable computer, an image capture device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable device, a vehicle-mounted wireless device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a UE may represent a terminal device configured for communication in accordance with one or more communication standards promulgated by the 3GPP (3rd Generation Partnership Project), such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a UE may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an Internet of Things (IOT) scenario, a UE may represent a machine or other device that performs monitoring and/or measurements, and transmits the results of such monitoring and/or measurements to another terminal device and/or network equipment. The UE may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a UE may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof In the following description and claims, unless defined otherwise, all technical and scientific terms used herein have the same meaning as commonly understood by one of ordinary skills in the art to which this disclosure belongs.

Although some embodiments are described in the context of exemplary 4G/5G (fourth generation/fifth generation) wireless system, it should not be construed as limiting the spirit and scope of the present disclosure. The principle and concept of the present disclosure may be more generally applicable to any other suitable wireless systems with the beamforming capacity.

The following will explain some terminology used herein, which may be a part of the prior art in the field of automatic control. As a start a number of representations of a dynamic process need to be introduced. A dynamic process is one where the output depends not only on the present input signal but also on previous inputs and outputs. Put otherwise the dynamic process has memory. A basic dynamic process may be a linear one that can be described by a differential equation as $$y^{(n)}(t) + a_1 y^{(n-1)}(t) + \ldots + a_n y(t) = b_0 u^{(m)}(t) + \ldots b_m u(t) \tag{1}$$

Here y(t) is the output signal, u(t) is the input signal, t is the time, while $a_i$ i=1 . . . n and $b_j$ j=0, . . . , m, are constant parameters. (i) denotes differentiation with regard to time i times. The above differential equation has an order n. It has one input signal and one output signal. For simplicity all concepts are explained in this context, but the generalization to more than one input signal and more than one output signal is available in prior art textbooks.

By taking Laplace transforms and setting initial values to zero, the differential equation is transformed to be represented by a transfer function H(s), where s denotes the Laplace transform variable which is closely related to the angular frequency used in Fourier transforms. The result is $$H(s) = \frac{B(s)}{A(s)} = \frac{b_0 s^m + b_1 s^{m-1} + \ldots + b_m}{s^n + a_1 s^{n-1} + \ldots + a_n}. \tag{2}$$

The relation between the output signal and input signal Laplace transforms Y(s) and U(s) may be $$Y(s) = H(s)U(s) \tag{3}$$

The poles $p_i$ i=1, . . . , n of the process are given by the equation A(s)=0. For simplicity only strictly stable (open loop) processes with all poles in the left complex half plane is considered here. In general poles are real or complex conjugate pairs.

The properties of the dynamic process can also be studied in the frequency domain in terms of complex valued frequency functions Y(jω), H(jω) and U(jω). ω denotes the angular frequency that fulfills ω=2πf, where f is the frequency in Hz. Below, frequency is used for angular frequency.

FIG. 1 schematically shows a block diagram of a feedback control loop. The following definition may be explained with respect to FIG. 1, where $F_y(s)$ is the feedback gain. The closed loop system may be then computed as follows $$Y(s) = W(s) + H(s)F_y(s)(Y_{ref}(s) - Y(s)), \tag{4}$$

which gives $$Y(s) = \frac{F_y(s)H(s)}{1 + F_y(s)H(s)} Y_{ref}(s) + \frac{1}{1 + F_y(s)H(s)} W(s). \tag{5}$$

This gives the effect of the reference signal and the disturbance on the output. The closed loop bandwidth $\omega_{CL}$ of the control system is typically given by the equation $$\left| \frac{F_y(j\omega_{CL})H(j\omega_{CL})}{1 + F_y(j\omega_{CL})H(j\omega_{CL})} \right|^2 = \frac{1}{2} \left| \frac{F_y(0)H(0)}{1 + F_y(0)H(0)} \right|^2. \tag{6}$$

The closed loop static error of the control system may be given by the equation $$y_{ref} - y = \frac{1}{1 + F_y(0)H(0)} (y_{ref} - w). \tag{7}$$

The static disturbance rejection of the control system may be given by the static sensitivity function $$S(0) = \frac{1}{1 + F_y(0)H(0)}. \tag{8}$$

The dynamic disturbance rejection of the control system may be determined by the sensitivity function $$S(j\omega) = \frac{1}{1 + F_y(j\omega)H(j\omega)}. \tag{9}$$

The complimentary sensitivity function of the control system, T(jω)=1−S(jω) determines the robustness of the control system with respect to un-modelled dynamics.

The following will explain feedback based beamforming using codebooks.

Figure 2:
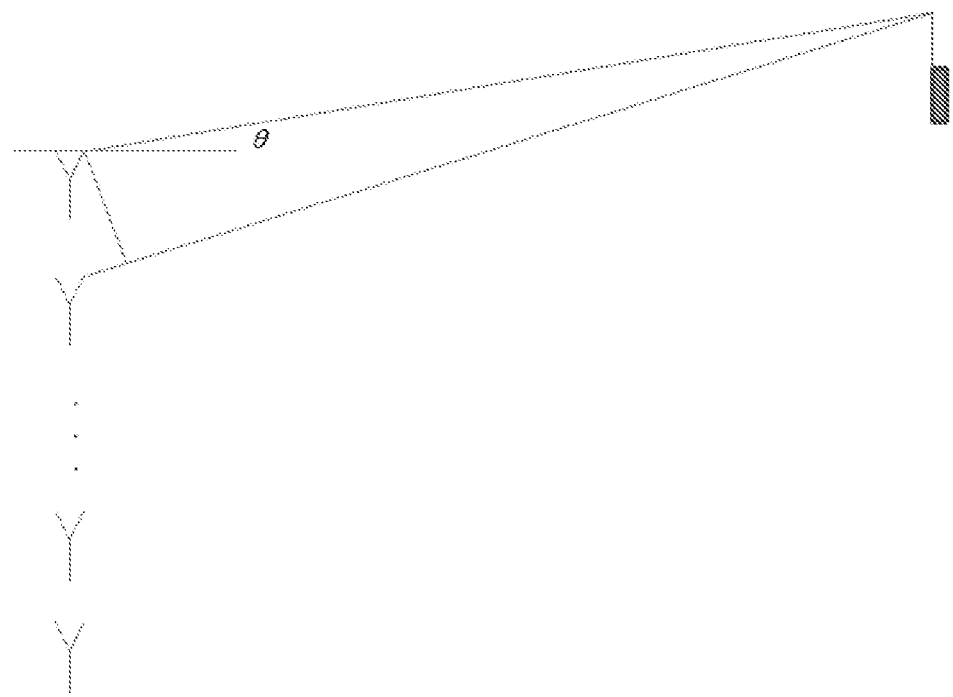
FIG. 2 schematically shows an one-dimensional beamforming case.

FIG. 2 schematically shows a one-dimensional beamforming case. In this case it is assumed that the UE is located far away from the antenna array, i.e. in the far-field, it follows that the difference in travel distance of radio waves from the base station to the UE between adjacent antenna elements is $$l = k\lambda \sin(\theta) \tag{10}$$

where kλ is the antenna element separation. Here is the carrier wavelength, k is the separation factor which may be 0.5-0.7 in a typical correlated antenna element arrangement. This means that if a reference signal $S_{BS}$ is transmitted from the base station, it may be received at the UE as the signal $$S_{UE} = \sum_{i=1}^{N} h_i S_{BS} e^{j\omega(t - il/c)} = \tag{11}$$

$$S_{BS} e^{j\omega t} \sum_{i=1}^{N} h_i e^{-j2\pi f_c \frac{ik\lambda \sin(\theta)}{f_c \lambda}} = S_{BS} e^{j\omega t} \sum_{i=1}^{N} h_i e^{-j2\pi i k \sin(\theta)}.$$

Here ω is the angular carrier frequency, $h_i$ is the complex channel from the $i_{th}$ antenna element, t is the time, and $f_c$ is the carrier frequency. In the above equation θ and $h_i$ are unknown. In case of a feedback solution, the UE therefore needs to search for all complex channel coefficients $h_i$ and the unknown angle θ. For this reason, the standard such as 3GPP standard defines a codebook of beams in different directions given by steering vector coefficients like $$W_{m,i} = e^{-jf(m,i)},$$

where m indicates a directional codebook entry. The UE may then test each codebook and estimate the channel coefficients. The information rate achieved for each codebook entry m is computed and the best one defines the direction and channel coefficients. This is possible since the pilot signal transmitted from the base station is a known signal at the receiver. The result is encoded and reported back to the base station. This provides the base station with a best direction (codebook entry) and information that allows it to build up a channel matrix H. This matrix represents the channel from each of the transmit antenna elements to each of the receive antenna elements. Typically, each element of H is represented by a complex number.

The feedbacked information may be denoted as CSI (Channel State Information), and it may include the CQI (Channel Quality Indication), a quantity directly related to the received signal to noise ratio, the PMI (Pre-code Matrix Index) which is the codebook entry, and the RI (Rank Indication) which expresses the "richness" of the channel which essentially tells how many parallel MIMO channels that can be sustained between the transmitter and receiver at the specific frequency.

The channel matrix can then be used for beamforming computations, or the direction represented by the reported codebook entry can be used directly.

The following will explain Reciprocity Assisted Transmission (RAT). Channel reciprocity is a consequence of Maxwell's equations. Given two nodes equipped with antenna arrays that communicate in a single frequency band, the channel reciprocity property means that at any given point in time, the complex channel coefficient between any transmitting antenna element in one node and any receiving antenna element in the other node, is the same (to within a transpose) in the uplink and the downlink. The channel matrix hence remains essentially the same between the antenna arrays of the two nodes when the direction of the transmission is reversed. The two nodes may typically be a UE (i.e. a mobile device) and a BS such as eNB or gNB in 5G. The time is assumed to be (almost) the same for the two directions of transmission.

To exploit reciprocity, the channel coefficients can be directly estimated by the BS from UE uplink transmission of known pilot signals, for example the sounding reference signals, SRSs. These signals are available in some wireless communications such as 4G and 5G wireless communications. The estimated channel can then be used to compute the combining weight matrix with a selected principle, and then used for downlink transmission. This works since the uplink and downlink channels are the same (to within a transpose) when reciprocity is valid.

A very simple MU (multi-user)-MIMO scheme is so called Zero-Forcing (ZF) transmission. This scheme is sensitive and structurally limited since the number of antenna elements in the transmitter and receiver needs to be equal. It is however very straightforward and easy to compute. The beamforming weights W may be then obtained from the estimated quadratic channel matrix H from the condition that the received signal vector s should equal the transmitted one x, i.e.

$$s = HWx = x, \forall x \Leftrightarrow W = H^{-1} \quad (12)$$

This choice thus makes the received data streams orthogonal in theory, provided that His square and invertible.

For RAT, the transmission scheme can be obtained by criterion minimization. In this case it is not needed that the estimated channel matrix H is a square matrix.

The standard RAT criterion to be minimized is then $$\hat{W} = \arg\min_W \|\hat{H}W - H^{ref}\|_{fro}^2 = \arg\min_W \|(\hat{H} + \tilde{H})W - H^{ref}\|_{fro}^2 = \quad (13)$$
$$\arg\min_W tr\left((\hat{H}W - H^{ref})(\hat{H}^{DL}W - H^{ref})^H + W^H \hat{\Gamma} W\right),$$

where $\hat{\Gamma}$ is the estimate of the covariance matrix of $\tilde{H}^{DL}$, and where it is assumed that $\hat{H}$ and $\tilde{H}$ are un-correlated. The minimizer of the criterion can be analytically computed as $$\hat{W} = ((\hat{H})^H \hat{H} + \hat{\Gamma})^{-1} (\hat{H})^H H^{ref} \quad (14)$$

Here $H^{ref}$ is the desired channel matrix after the beamforming computations and the subscript $_{fro}$ denotes the use of the Frobenius norm.

For wireless devices such as 4G/5G base stations and radios that are equipped with advanced antenna systems (AAS), these antenna systems increase the capacity and/or coverage of existing wireless systems by addition of an antenna array. This enables the simultaneous transmission of parallel data streams between a base station and a UE, so called MIMO transmission. In some cases, like when millimeter-wave (mmW) carrier frequencies are used, the main desired effect is rather to enhance coverage by exploiting the high beamforming gain of the AAS.

A consequence of the increasing beamforming gain is that the radiated energy is concentrated in beams, for which the effective isotropic radiated power (EIRP), i.e. the power radiated from an antenna with unity antenna gain in all directions, is increased as compared to the situation without AAS systems. The RF EMF exposure limits are typically expressed in terms of power density (W/m$^2$) which in the far field is proportional to the EIRP. Consequently, the EIRP can be used to determine the power density in the far field. This implies that the experienced momentary EIRP, and the resulting power density at a given distance from the antenna, will be higher in a beam generated by an AAS system with beam forming gain, than without such an AAS system.

The ICNIRP and other RF EMF exposure limitations may be expressed as the average power density over a specified time interval T. This means that the momentary power density may be significantly higher during a shorter time than T, however the time-averaged power density over any time period T must be below the specified limit. To maintain a certain RF EMF exposure compliance distance (or boundary), that is shorter (or smaller) than what is obtained using the maximum EIRP of the AAS, the time-averaged EIRP needs to be maintained at or below a pre-determined threshold or a set of pre-determined thresholds for different beam directions.

There may be several problems with the technology available in prior art that prevent a solution to the problem of limiting the AAS time-averaged radiated power for RF EMF exposure regulation compliance. For example, the problems may include:

(1). There is no actuator mechanism known in prior art that provides a dynamic and at the same time smooth limitation of scheduled resources in the scheduler of a wireless device such as a BS, said limitation may be dependent on an averaged output power.

(2). There is no feedback control mechanism known in prior art that controls said actuator mechanism with a control signal computed from an averaged power and a reference value, where said averaged power may be dependent on beamforming gains computed from either a precoder matrix indices of codebook based beamforming, where said beamforming gains may be precomputed and stored in a look-up table; or where said averaged power may be dependent on beamforming gains computed from beamforming weights generated by the solutions to a reciprocity assisted optimization problem.

To overcome or mitigate at least one of above mentioned problems or other problems or provide a useful solution, the embodiments of the present disclosure propose a solution. Some embodiments of the present disclosure disclose a new method to compute the time-averaged power for codebook based and reciprocity assisted beamforming. The computation may divide the directional space in bins covering a portion of the total solid angle covered by the antenna array. Whenever a beamforming transmission is performed, the power contribution to a bin (e.g., each bin) may be computed from the scheduled power multiplied with the antenna gain of the beamforming transmission in said bin. In case of codebook based beamforming, the antenna gain part of this computation can be precomputed and stored in a look-up-table. In case of reciprocity assisted based beamforming, there may be no fixed set of codebook "beams" and in this case the computation of the antenna gain may depend on the solutions to a reciprocity assisted optimization problem. In some embodiment, the computed power for the bin may be normalized with the total max transmit power and a maximum beam gain, thereby obtaining an estimated normalized (to [0,1]) power for the bin, representative of a certain direction in azimuth and possibly elevation. When the estimated normalized power is multiplied with a total power measured at one or more of the power amplifiers in the radio of the wireless device, the obtained total power per bin can be used for back-off power feedback control, for each direction defined by the bin. In addition, some embodiments of the present disclosure can be used for both the grid of beams AAS system and the RAT AAS system. This may enable one software (SW) track solution which can keep down development and maintenance costs.

FIG. 3 shows a flowchart of a method according to an embodiment of the present disclosure. The method 300 may be implemented at a wireless device such as a BS. The method may comprise computing an average power for a bin covering a portion of a total solid angle covered by an antenna array of the wireless device by averaging a momentary power for the bin over a time period, wherein the momentary power is computed based on respective scheduled power of at least one beamforming transmission and respective antenna gain of the at least one beamforming transmission in the bin at block 302; and performing a back-off power feedback control for the bin based on the computed average power at block 304.

At block 302, the wireless device may compute an average power for a bin covering a portion of a total solid angle covered by an antenna array of the wireless device by averaging a momentary power of the bin over a time period. The momentary power may be computed based on respective scheduled power of at least one beamforming transmission and respective antenna gain of the at least one beamforming transmission in the bin. The average power may be the average radiated power or any other suitable processing result of the average radiated power. The time period may be preconfigured/amended by for example an operator or a manufactorer of the wireless device.

A bin may be represented by a solid angle covered by an antenna array of the wireless device. The solid angle may be defined in various ways. For example, the solid angle may be approximately defined by the following selection of ranges in azimuth ($\theta$) and elevation ($\varphi$)

$$\Omega_{i,j} = [\theta_i, \theta_{i+1}] \times [\varphi_j, \varphi_{j+1}], i=0,\ldots,N-1, j=0,\ldots,M-1. \quad (15)$$

To describe the principle of computation, a number of quantities may be defined, valid for a certain point in time, e.g. a transmission time interval (TTI).

A steering vector with index i, j may be denoted as $\alpha^{i,j}$. This vector may be representative of the direction in azimuth and elevation for the solid angle index i, j.

The number of beamforming weight for a multi-user group $n_g$ is $N_{w,n_g}$. These weights may be denoted as $w_{0,ng}$, $w_{1,ng}$, ..., $w_{N_{w,ng}-1,n_g}$. Note that these weights can be generated in various ways, e.g. by codebook based beamforming or by the solution of a reciprocity assisted optimization problem. The number of multi-user groups is $N_g$. There are two cases to consider.

Case 1: In this case the beam gains are available, which may be denoted as $G_{0,ng}, G_{1,ng}, \ldots, G_{n_w n_g}, \ldots, G_{B_w-1, n_g}$. In other words, there may be $N_{w,n_g}$ possible beam gains available. This may be a typical situation when codebook based beamforming is used, e.g to operate a grid of beams beamforming AAS. However, it is applied for reciprocity assisted beamforming as well. Then the EIRP $\rho$ responding to the direction indices I, j at time t may be computed as $$\rho(i, j, t) = P_{tot}(t) \sum_{n_g=0}^{N_g-1} \sum_{n_w=0}^{N_w-1} v_{i,j,n_w,n_g,case1}(t) \frac{\eta n_g(t)}{\eta_{\max}}. \quad (16)$$

Here $P_{tot}(t)$ denotes the total transmit power of the radio of the wireless device at time t, $v_{i,j,n_w,n_g,case1}(t)$ denotes the fraction of the gain of beam $n_w$ of multi-user group $n_g$ that is valid in the direction given by indices i,j at time t.

$$\frac{\eta n_g(t)}{\eta_{\max}}$$

is the fraction of the resources such as the Physical resource blocks (PRBs), that is used by the multi-user group $n_g$, $\eta_{n_g}(t)$ denotes one or more scheduled resources used by the beamforming transmission in the multi-user group $n_g$, and $\eta_{max}$ denotes the maximally schedulable resources for the multi-user group $n_g$. The first quantity may be given by the formula $$v_{i,j,n_w,n_g,case1}(t) = \frac{\|(\alpha^{i,j}(t))^H w_{n_w,n_g}(t)\|^2}{\|(w_{n_w,n_g}(t))^H w_{n_w,n_g}(t)\|^2} G_{n_w,n_g}(t), \quad (17)$$

where $$G_{n_w,n_g}(t) = \frac{\tilde{P}_b(t)}{\tilde{P}_c(t)}$$

expresses the power ratio between a user beam and the common (control channel) beam, both codebook based beamforming and reciprocity assisted based beamforming can have the calculated power ratio.

Case 2: In this case there are no beam gains available. This may be a typical situation when reciprocity assisted based beamforming is applied, however it is applied for codebook-based beamforming as well. In this case $$\rho(i, j, t) = P_{tot}(t) \sum_{n_g=0}^{N_g-1} \sum_{n_w=0}^{N_w-1} v_{i,j,n_w,n_g,case2}(t) \frac{\eta_{n_g}(t)}{\eta_{max}}. \quad (18)$$

Here $$v_{i,j,n_w,n_g,case2}(t) = \|(\alpha^{i,j}(t))^H w_{n_w,n_g}(t)\|^2. \quad (19)$$

The beam gains $Gain_{i,j}(t)$ in the direction i, j for the two cases can be calculated as following. Since $\rho(i, j, t) = Gain_{i,j}(t)P_{tot}(t)$. Therefore, the two cases above may result in beam gains given by Case 1:

$$Gain_{i,j,case1}(t) = \quad (20)$$

$$\sum_{n_g=0}^{N_g-1} \sum_{n_w=0}^{N_w-1} \frac{\|(\alpha^{i,j}(t))^H w_{n_w,n_g}(t)\|^2}{\|(w_{n_w,n_g}(t))^H w_{n_w,n_g}(t)\|^2} G_{n_w,n_g}(t) \frac{\eta_{n_g}(t)}{\eta_{max}}.$$

Case 2:

$$Gain_{i,j,case2}(t) = \sum_{n_g=0}^{N_g-1} \sum_{n_w=0}^{N_w-1} \frac{\eta_{n_g}(t)\|(\alpha^{i,j}(t))^H w_{n_w,n_g}(t)\|^2}{\eta_{max}}. \quad (21)$$

To further illustrate the beam computation ideas, a numerical example is presented. To describe the setup in the example, codebook based beamforming is selected. The azimuth domain is first separated in M directions by gridding, while the elevation domain uses N grids.

As described above, the direction of each grid can be expressed by the two angles $\theta_i, \varphi_j$, $i=0 \ldots M-1$, $j=0 \ldots N-1$. To simplify still further, only the horizontal directions were considered, using M=17,$\varphi$=90°, $\theta \in$ {−90°, −61°, −49°, −39°, −30°, −22°, −14°, −7°, 0°, 7°, 14°, 22°, 30°, 39°, 49°, 61°, 90°}.

At the first TTI, assume that there are five codebooks scheduled (beam 1/5/10/20/30), using the following fractions of the bandwidth in table 1:

TABLE 1

| Codebook index | PRBs | total PRBs |
|---|---|---|
| 1 | 25 | 100 |
| 5 | 20 | 100 |
| 10 | 30 | 100 |
| 20 | 20 | 100 |
| 30 | 5 | 100 |

The antenna gains corresponding to each of the used codebook indices are shown in FIG. 4. In the direction $\varphi$=90°, $\theta$=0°, the EIRP can then be calculated as the power allocated to each codebook, multiplied by its beam gain in the direction $\varphi$=90°, $\theta$=0°. This gives $p_{i,j}(t)$=32*0.25+ 0*0.2+0.5198*0.3+0.6913*0.2+5.607*0.05=8.5746 assuming $P_{tot}(t)$=1.

In an embodiment, a scheduled power of a beamforming transmission may be computed by multiplying a total transmit power without the antenna gain with a resource ratio between one or more scheduled resources used by the beamforming transmission and maximally schedulable resources. For example, the scheduled power of a beamforming transmission may be computed by $$\frac{\eta_{n_g}(t)}{\eta_{max}} P_{tot}(\tau).$$

In an embodiment, the total transmit power without the antenna gain may be measured before the antenna array. For example, the total output power of the radio over all directions can be measured in the radio, just before the antenna array. For example, this can be done by couplers that measure the radio signal amplitude at each signal path to an antenna element. These amplitudes can then be combined into a total output power of the radio, with the antenna gain removed. This measurement may also be denoted as $P_{tot}(t)$, and it may replace the computed power in baseband.

In an embodiment, the total transmit power without the antenna gain may be predicted. For example, the total transmit power may be predicted by using information available in a scheduler or in a base band. Such a quantity could be easily obtained, e.g. by summing up the momentary scheduled power as estimated by the fraction of PRBs used at each time instant, over the time T.

An estimate of the average power in direction i,j may be composed of the main lobe transmission to users in direction i,j, and the "sidelobe transmissions" for users in all other directions. All these effects may be captured by the summation employed to compute $Gain_{i,j,casec}(t)$, where c=1,2. This means that the equivalent radio power before power amplifiers (PAs) contributing in direction i,j may become $$\langle P_{tot} \rangle_{i,j}(t) = \quad (22)$$

$$\frac{1}{T} \int_{t-T}^{t} \frac{Gain_{i,j,casec}(\tau)}{G_{max}} P_{tot}(\tau) d\tau = \frac{1}{T} \int_{t-T}^{t} K_{i,j}(\tau) P_{tot}(\tau) d\tau =$$

$$\frac{1}{T} \int_{t-T}^{t} \frac{\sum_{n_g=0}^{N_g-1} \sum_{n_w=0}^{N_w-1} v_{i,j,n_w,n_g,casec}(\tau) \frac{\eta_{n_g}(t)}{\eta_{max}}}{G_{max}} P_{tot}(\tau) d\tau.$$

In this equation, $\{P_{tot}\}_{i,j}(t)$ is the average power quantity for direction i,j, and $P_{tot}(t)$ is the momentary measured/predicted total power in the radio.

$$\frac{\eta_{n_g}(t)}{\eta_{max}} P_{tot}(\tau)$$

is the scheduled power of a beamforming transmission in a bin. $v_{i,j,n_w,n_g,casec}(\tau)$ denotes the fraction of the gain of beam $n_w$ of multi-user group $n_g$ that is valid in the direction given by indices i,j at time t. This means that all quantities are transformed back to relate to the maximum radiated power in one single direction. When a single user exploits all resources and applies the maximum gain $G_{max}$ of the antenna array, the above equation collapses to the average of $P_{tot}(t)$, as desired.

It is noted that the average power in direction i,j may be computed in any other suitable form. For example, $$\langle P_{tot}\rangle_{i,j}(t) = \frac{1}{T}\int_{t-T}^{t} \text{Gain}_{i,j,casec}(\tau)P_{tot}(\tau)d\tau. \qquad (23)$$

At block 304, the wireless device may perform a back-off power feedback control for the bin based on the computed average power. The back-off power feedback control may be implemented in various ways to limit the averaged output power in each direction.

In an embodiment, to get a smooth behavior of the limiting resource thresholds applied in the scheduler of the wireless device to limit the averaged output power in each direction, the thresholds may need to be rate controlled. There may need to be one dynamic threshold for each direction, ij. The rate control means that the control signal commands to the threshold provide adjustments to the limiting thresholds, making them increase or decrease. The dynamics of the actuator mechanism may be therefore determined to be $$\dot{\gamma}_{i,j}(t)=u_{i,j}(t), i=0,\ldots,N-1, j=0,\ldots,M-1. \qquad (24)$$

Where $\gamma_{i,j}(t)$, i=0, ..., N-1, j=0, ..., M-1 are the resource thresholds and where $u_{i,j}(t)$, i=0, ..., N-1, j=0, ..., M-1 are the control signals further discussed below. t denotes continuous time. The resource thresholds may be decoupled from the scheduler algorithms themselves, and it may express the fractional limitations of the scheduler not to use more than a fraction $\gamma_{i,j}(t)$, i=0, ..., N-1, j=0, ..., M-1 of its total resources, in a certain direction. The scheduler may then limit the number of resources (e.g., PRBs) it uses, or limit any other quantity that correlates well with the resource thresholds.

The maximum values of $\gamma_{i,j}(t)$, i=0, ..., N-1, j=0, ..., M-1 are obviously 1.0 since they are to express a fraction of the maximum amount of scheduler resources. In an embodiment, there may be also a need to limit their lower values to avoid that the dynamic feedback control mechanisms reduce them to unphysical values below 0.0. The following scheduler threshold limitations may be therefore applied.

$$0\leq\gamma_{low}\leq\gamma_{i,j}(t)\leq 1.0, i=0,\ldots,N-1, j=0,\ldots,M-1. \qquad (25)$$

In an embodiment, the wireless device may perform the back-off power feedback control for the bin based on the computed average power by generating by a controller a control signal based on the computed average power and a setpoint for the average power for the bin; generating a resource threshold for the bin applied in a scheduler based on the control signal; and applying the resource threshold in the scheduler to limit a number of resources used for the bin or limit any other quantity used for the bin that correlates with the resource threshold.

Figure 5:
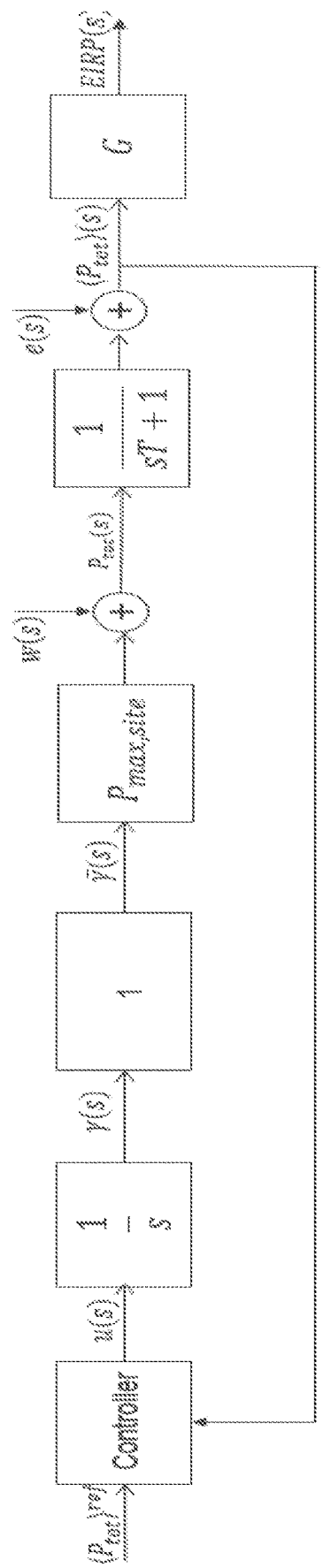
FIG. 5 schematically shows a feedback control mechanism according to an embodiment.

FIG. 5 schematically shows a feedback control mechanism according to an embodiment. In this embodiment, the limitation of $\gamma_{i,j}(t)$ is inactive and no other constraints are active. The feedback control has been enabled by a supervision mechanism described below. The summed up momentary resource utilization is replaced by the average value. It is also assumed that the average resource utilization is the same for all directions.

As shown in FIG. 5, $\langle P_{tot}\rangle_{i,j}^{ref}$ denotes the setpoint for the averaged power for a direction i,j. The setpoint may be preconfigured. In an embodiment, $\langle P_{tot}\rangle_{i,j}^{ref}$ is typically slightly less than the RF emission limit. 1/s denotes the actuator dynamics with lower and upper limits inactive. $\bar{\gamma}(s)$ denotes the scheduler limitation after lower and upper limitation (inactive in FIG. 5). $P_{max,site}$ denotes the maximal total power of the site. w(s) denotes a disturbance, representing power computation errors. 1/(sT+1) represents an autoregressive simplified model of the averaging. $\langle P_{tot}\rangle_{i,j}(s)$ denotes the averaged total power for the direction i,j. $P_{tot,i,j}(s)$ is the momentary power defined for the direction ij. Block G denotes the beam gain. Note that all quantities are here expressed in the Laplace transform domain, which is allowed since the feedback control mechanism design is performed with constraints inactive.

In an embodiment, the controller block may be given by $$u_{i,j}(s)=C_{i,j}(1+T_{D,i,j}s)(\langle P_{tot}\rangle_{i,j}^{ref}-\langle P_{tot}\rangle_{i,j}(s)). \qquad (26)$$

In an embodiment, the controller may be of proportional-derivative (PD) type. In other embodiments, the controller may be any other suitable type of controller. $C_{i,j}$ denotes the proportional gain, and $T_{D,j,i}$ denotes the differentiation time. Following standard procedures of automatic control, the poles of the closed loop system of FIG. 1 may be given by the following second order equation $$s^2+(1/T+P_{max,site}K_{i,j}C_{i,j}T_{D,i,j})s+P_{max,site}K_{i,j}C_{i,j}=0. \qquad (27)$$

These poles govern the closed loop dynamics of the feedback control mechanism, the actuator mechanism, and the averaged power. In order to determine the proportional gain and the differentiation time, a closed loop polynomial with desired poles in $-\alpha_1$ and $-\alpha_2$ is specified, independent of i,j, as $$s^2+(\alpha_1+\alpha_2)s$$

An identification of coefficients and solution of the resulting system of equations reveal that the proportional gain and differentiation time shall be selected as $$C_{i,j} = \frac{\alpha_1\alpha_2}{K_{i,j}P_{max,site}}, \qquad (29)$$

$$T_D = T_{D,i,j} = \frac{\alpha_1+\alpha_2-\frac{1}{T}}{\alpha_1\alpha_2}. \qquad (30)$$

$C_{i,j}$ compensates for the gain variation with the direction, while the differentiation time is not dependent on the direction.

A reason for this choice is that a system with two negative real poles can be expected to be well damped, which is a result of a significant differentiation action. Since differentiation action is needed for fast back-off close to the determined threshold, this is the preferred design choice.

To implement the feedback control mechanism, $\langle P_{tot}\rangle_{i,j}^{ref}$, and $\langle P_{tot}\rangle_{i,j}(t)$ are needed. The first two quantities can be obtained as described above, while the third quantity can be estimated. This can e.g. be done by autoregressive filtering of $\langle P_{tot}\rangle_{i,j}(t)$ with the filter $$\langle \dot{P}_{tot}\rangle_{i,j}(s) = \frac{\alpha s}{s+\alpha}\langle P_{tot}\rangle_{i,j}(s). \qquad (31)$$

In an embodiment, in order to further emphasize the back-off control performance it would be advisable to only allow differential control action that reduces the scheduler threshold $\gamma_{i,j}(t)$, meaning that only negative contributions from the second term of the feedback mechanism should be allowed. This means that in the time domain, the following restriction to the derivative $\langle P_{tot}\rangle_{1,j}(t)$ is applied $$u_{i,j}(t) = C_{i,j}(\langle P_{tot}\rangle_{i,j}{}^{ref} - \langle P_{tot}\rangle_{i,j}(t)) - C_{i,j}T_D \max(0, \langle P_{tot}\rangle_{i,j}(t)). \quad (32)$$

In an embodiment, sometimes it may happen that the feedback control mechanism is not fast enough to prevent a small overshoot of the power threshold. To prevent that from happening a hard back-off is superimposed over the disclosed feedback control mechanism. This hard back-off may operate by setting the scheduler threshold to its minimum value $\gamma_{low}$ whenever $$\langle P_{tot}\rangle_{i,j}(t) > \text{margin} \cdot P_{max}. \quad (33)$$

where margin may be a value slightly below 1 and where $P_{max}$ is the maximum average power threshold.

In an embodiment, when the back-off power feedback control is not needed, the feedback control mechanism may be preferably disabled, leaving the wireless device to operate without any back-off power feedback control such as obtained by a scheduler limitation. A supervision mechanism for enabling and disabling the feedback control mechanisms may comprise:

Turn on feedback control mechanisms when $\langle P_{tot}\rangle_{i,j}(t) > \delta_1 P_{max,site}$, and set $\gamma_{i,j}(t)=1.0$.

Turn off the feedback control mechanisms when $\langle P_{tot}\rangle_{i,j}(t) < \delta_2 P_{max,site}$. The values need to fulfill $\delta_2 P_{max,site} \leq \langle P_{tot}\rangle_{i,j}^{ref} \leq \delta_1 P_{max,site}$.

The above embodiment has been disclosed in continuous time. When implemented with computer control, discretization can be done e.g. with the Euler approximation or with the so called Tustin approximation. These techniques are well known from prior art.

FIG. 6 shows a flowchart of a method 600 according to an embodiment of the present disclosure. Blocks 606 and 608 are similar to blocks 302 and 304 of FIG. 3, therefore the description thereof is omitted here for brevity. As shown in FIG. 6, the wireless device may generate respective beamforming weights for the at least one beamforming transmission by using codebook based beamforming or by using a solution to a reciprocity assisted optimization problem at block 602. These techniques are well known from prior art. The wireless device may obtain the respective antenna gain in the bin based on the respective beamforming weight at block 604. For example, the wireless device may obtain the respective antenna gain in the bin based on the respective beamforming weights as shown in FIG. 4.

In an embodiment, when the codebook based beamforming is used, the respective antenna gain in the bin may be obtained from a look-up-table where the respective antenna gain in the bin is precomputed and stored.

FIG. 7 shows a flowchart of a method 700 according to an embodiment of the present disclosure. Blocks 702 and 708 are similar to blocks 302 and 304 of FIG. 3, therefore the description thereof is omitted here for brevity. As shown in FIG. 7, the wireless device may obtain an estimated normalized power for the bin by normalizing the computed average power with a total max transmit power and a maximum beam gain at block 704. The wireless device may obtain a total power for the bin by multiplying the estimated normalized power with a total power measured at at least one power amplifier in a radio of the wireless device at block 706. The obtained total power for the bin may be used for the back-off power feedback control for the bin.

FIG. 8 shows a flowchart of a method 800 according to an embodiment of the present disclosure. Blocks 802 and 808 are similar to blocks 302 and 304 of FIG. 3, therefore the description thereof is omitted here for brevity. As shown in FIG. 8, the wireless device may turn on the back-off power feedback control for the bin when the computed average power is greater than a first threshold at block 804. The wireless device may turn off the back-off power feedback control for the bin and set a resource threshold for the bin applied in a scheduler as the maximum value when the computed average power is smaller than a second threshold at block 806. The first threshold is greater than the second threshold.

In an embodiment, the first threshold may be set as $\delta_1 P_{max,site}$ and the second threshold may be set as $\delta_2 P_{max,site}$, where $P_{max,site}$ denotes maximal total power of a radio of the wireless device, $0 \leq \delta_2 \leq 1$ and $0 \leq \delta_1 \leq 1$.

In an embodiment, the wireless device may only allow a differential control action that reduces the power of the bin at block 904-2 as shown in FIG. 9. For example, the wireless device may only allow differential control action that reduces the scheduler threshold $\gamma_{i,j}(t)$ as described above.

FIG. 10 shows a flowchart of a method 1000 according to an embodiment of the present disclosure. Blocks 1002 and 1006 are similar to blocks 302 and 304 of FIG. 3, therefore the description thereof is omitted here for brevity. As shown in FIG. 10, the wireless device may set a resource threshold for the bin applied in a scheduler as minimum value when the computed average power is greater than a fraction of a determined maximum averaged power threshold to meet certain regulatory requirements at block 1004. For example, the wireless device may operate based on the equation 33 as described above.

In an embodiment, the wireless device may comprise any suitable wireless device with beamforming capacity, such as a base station. In an embodiment, the wireless device may be equipped with advanced antenna systems (AAS).

Figure 11:
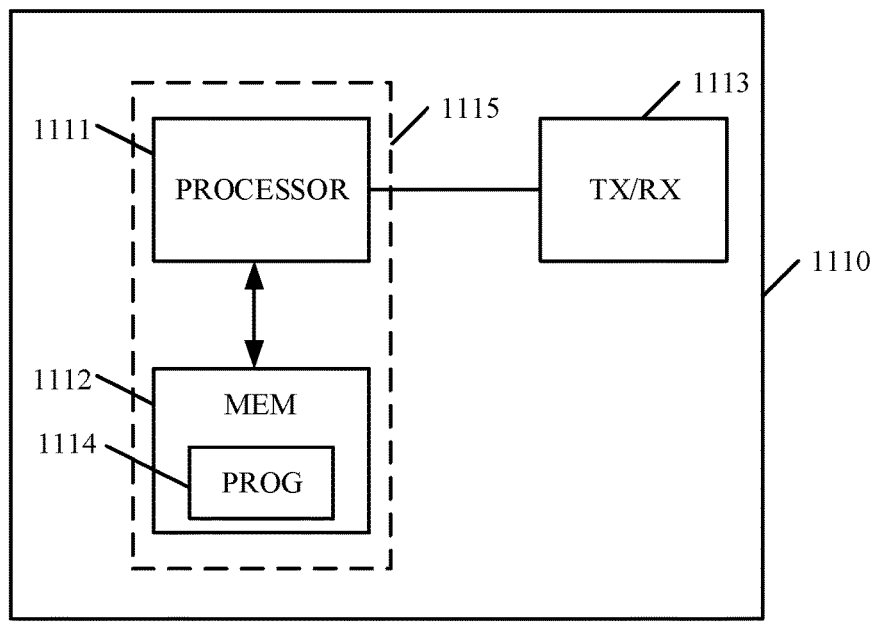
FIG. 11 illustrates a simplified block diagram of an apparatus according to an embodiment of the present disclosure.

FIG. 11 illustrates a simplified block diagram of an apparatus 1110 that may be embodied in/as a wireless device according to an embodiment of the present disclosure.

The apparatus 1110 may comprise at least one processor 1111, such as a data processor (DP) and at least one memory (MEM) 1112 coupled to the processor 1111. The apparatus 1110 may further comprise a transmitter TX and receiver RX 1113 coupled to the processor 1111. The MEM 1112 stores a program (PROG) 1114. The PROG 1114 may include instructions that, when executed on the associated processor 1111, enable the apparatus 1110 to operate in accordance with the embodiments of the present disclosure, for example to perform any of the method 400. A combination of the at least one processor 1111 and the at least one MEM 1112 may form processing means 1115 adapted to implement various embodiments of the present disclosure.

Various embodiments of the present disclosure may be implemented by computer program executable by one or more of the processors 1111, software, firmware, hardware or in a combination thereof.

The MEM 1112 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 1111 may be of any type suitable to the local technical environment, and may include one or more of general purpose computers, special purpose computers, microprocessors, digital signal processors DSPs and processors based on multicore processor architecture, as non-limiting examples.

Figure 12:
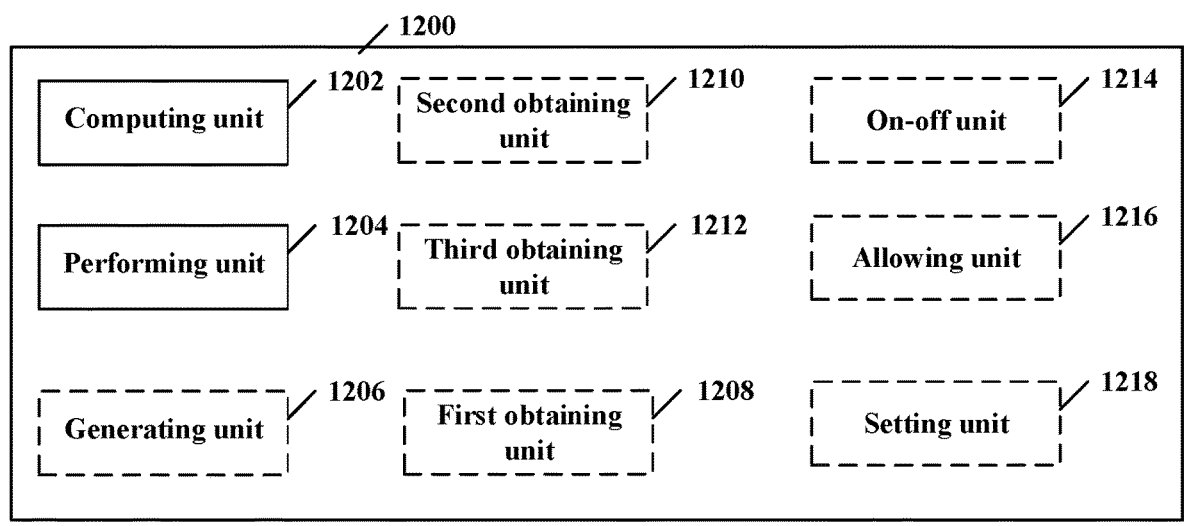
FIG. 12 illustrates a simplified block diagram of an apparatus according to another embodiment of the present disclosure.

Reference is now made to FIG. 12, which illustrates a schematic block diagram of an apparatus 1200 implemented at a wireless device. The apparatus 1200 is operable to carry out any of the exemplary method as described above and possibly any other processes or methods.

As shown in FIG. 12, the apparatus 1200 may comprise a computing unit 1202 configured to compute an average power for a bin covering a portion of a total solid angle covered by an antenna array of the wireless device by averaging a momentary power for the bin over a time period, wherein the momentary power is computed based on respective scheduled power of at least one beamforming transmission and respective antenna gain of the at least one beamforming transmission in the bin; and a performing unit 1204 configured to perform a back-off power feedback control for the bin based on the computed average power.

In an embodiment, the apparatus 1200 may further comprise a generating unit 1206 configured to generate respective beamforming weight for the at least one beamforming transmission by using codebook based beamforming or by using a solution to a reciprocity assisted optimization problem; and a first obtaining unit 1208 configured to obtain the respective antenna gain in the bin based on the respective beamforming weight.

In an embodiment, when the codebook based beamforming is used, the respective antenna gain in the bin is obtained from a look-up-table where the respective antenna gain in the bin is precomputed and stored.

In an embodiment, a scheduled power of a beamforming transmission is computed by multiplying a total transmit power without the antenna gain with a resource ratio between one or more scheduled resources used by the beamforming transmission and maximally schedulable resources.

In an embodiment, a fraction of a gain of beam $n_w$ of a multi-user group $n_g$ that is valid in a direction given by a steering vector $\alpha^{ij}$ with index ij at time t is computed as:

$$v_{i,j,n_w,n_g}(t) = \frac{\|(\alpha^{i,j}(t))^H w_{n_w,n_g}(t)\|^2}{\|(w_{n_w,n_g}(t))^H w_{n_w,n_g}(t)\|^2} G_{n_w,n_g}(t) \text{ or}$$

$$v_{i,j,n_w,n_g}(t) = \|(\alpha^{i,j}(t))^H w_{n_w,n_g}(t)\|^2$$

where $w_{n_w,n_g}(t)$ denotes the beamforming weight of the beam $n_w$ of the multi-user group $$n_g, G_{n_w,n_g}(t) = \frac{\tilde{P}_b(t)}{\tilde{P}_c(t)}$$

denotes a power ratio between a user beam $\tilde{P}_b(t)$ and a common/control channel beam $\tilde{P}_c(t)$.

In an embodiment, the apparatus 1200 may further comprise a second obtaining unit 1210 configured to obtain an estimated normalized power for the bin by normalizing the computed average power with a total max transmit power and a maximum beam gain; and a third obtaining unit 1212 configured to obtain a total power for the bin by multiplying the estimated normalized power with a total power measured at at least one power amplifier in a radio of the wireless device, wherein the obtained total power for the bin is used for the back-off power feedback control for the bin.

In an embodiment, the apparatus 1200 may further comprise an on-off unit 1214 configured to turn on the back-off power feedback control for the bin when the computed average power is greater than a first threshold; and turning off the back-off power feedback control for the bin and setting a resource threshold for the bin applied in a scheduler as the maximum value when the computed average power is smaller than a second threshold, wherein the first threshold is greater than the second threshold.

In an embodiment, the first threshold is set as $\delta_1 P_{max,site}$ and the second threshold is set as $\delta_2 P_{max,site}$, where $P_{max,site}$ denotes maximal total power of a radio of the wireless device, $0 \leq \delta_2 \leq 1$ and $0 \leq \delta_1 \leq 1$.

In an embodiment, the apparatus 1200 may further comprise an allowing unit 1216 configured to only allow a differential control action that reduces the power of the bin.

In an embodiment, the apparatus 1200 may further comprise a setting unit 1218 configured to when the computed average power is greater than a fraction of the determined maximum averaged power threshold, set a resource threshold for the bin applied in a scheduler as minimum value.

In an embodiment, the performing unit 1204 is configured to generate by a controller a control signal based on the computed average power and a setpoint for the average power for the bin; generate a resource threshold for the bin applied in a scheduler based on the control signal; and apply the resource threshold in the scheduler to limit a number of resources used for the bin or limit any other quantity used for the bin that correlates with the resource threshold.

In an embodiment, the controller may be of proportional-derivative (PD) type.

In an embodiment, the setpoint may be smaller than the determined maximum averaged power threshold.

In an embodiment, the wireless device comprises a base station.

In an embodiment, the wireless device is equipped with advanced antenna systems (AAS).

In an embodiment, the total transmit power without the antenna gain is measured before the antenna array or predicted.

In an embodiment, the total transmit power without the antenna gain is predicted by using information available in a scheduler or in a base band.

Figure 19:
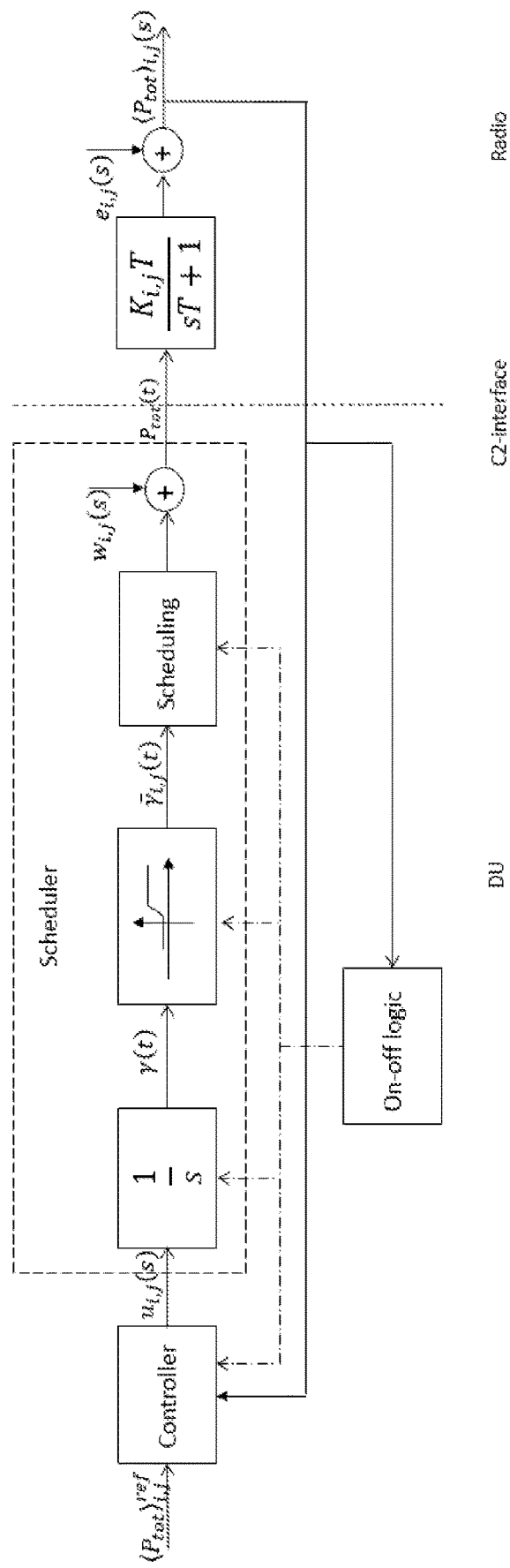
FIG. 19 schematically shows an architecture for back-off power feedback control according to an embodiment of the disclosure.
Figure 20:
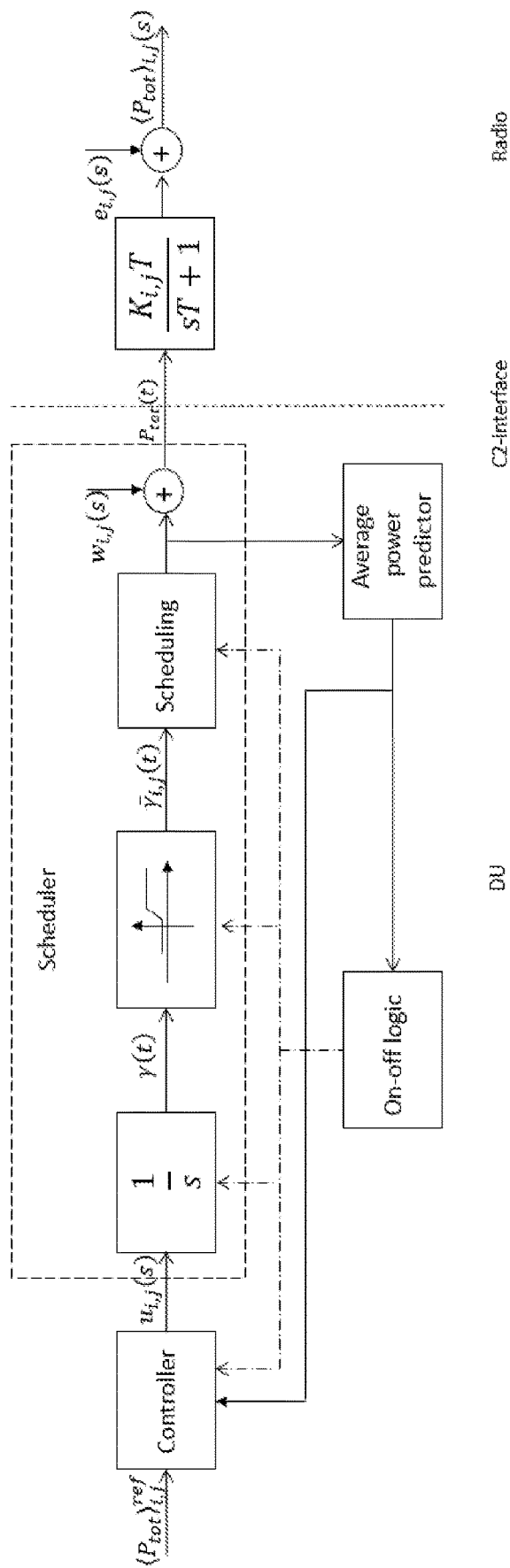
FIG. 20 schematically shows an architecture for back-off power feedback control according to another embodiment of the disclosure.

Some embodiments of the present disclosure are able to operate both with predicted and measured average power signals. FIG. 19 schematically shows an architecture back-off power feedback control according to an embodiment of the disclosure, where the measured averaged total power feedback from the AAS system of the radio is used. FIG. 20 schematically shows an architecture for back-off power feedback control according to an embodiment of the disclosure, where the predicted averaged power is used. DU denotes digital unit. The On-off logic block is similar to that of the on-off unit 1214 as described above. The other blocks may be similar to corresponding blocks as described with reference to FIG. 5.

According to an aspect of the disclosure it is provided a computer program product being tangibly stored on a computer readable storage medium and including instructions which, when executed on at least one processor, cause the at least one processor to carry out any of the methods related to the wireless device as described above.

According to an aspect of the disclosure it is provided a computer-readable storage medium storing instructions which when executed by at least one processor, cause the at least one processor to carry out carry out any of the methods related to the wireless device as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

Figure 13:
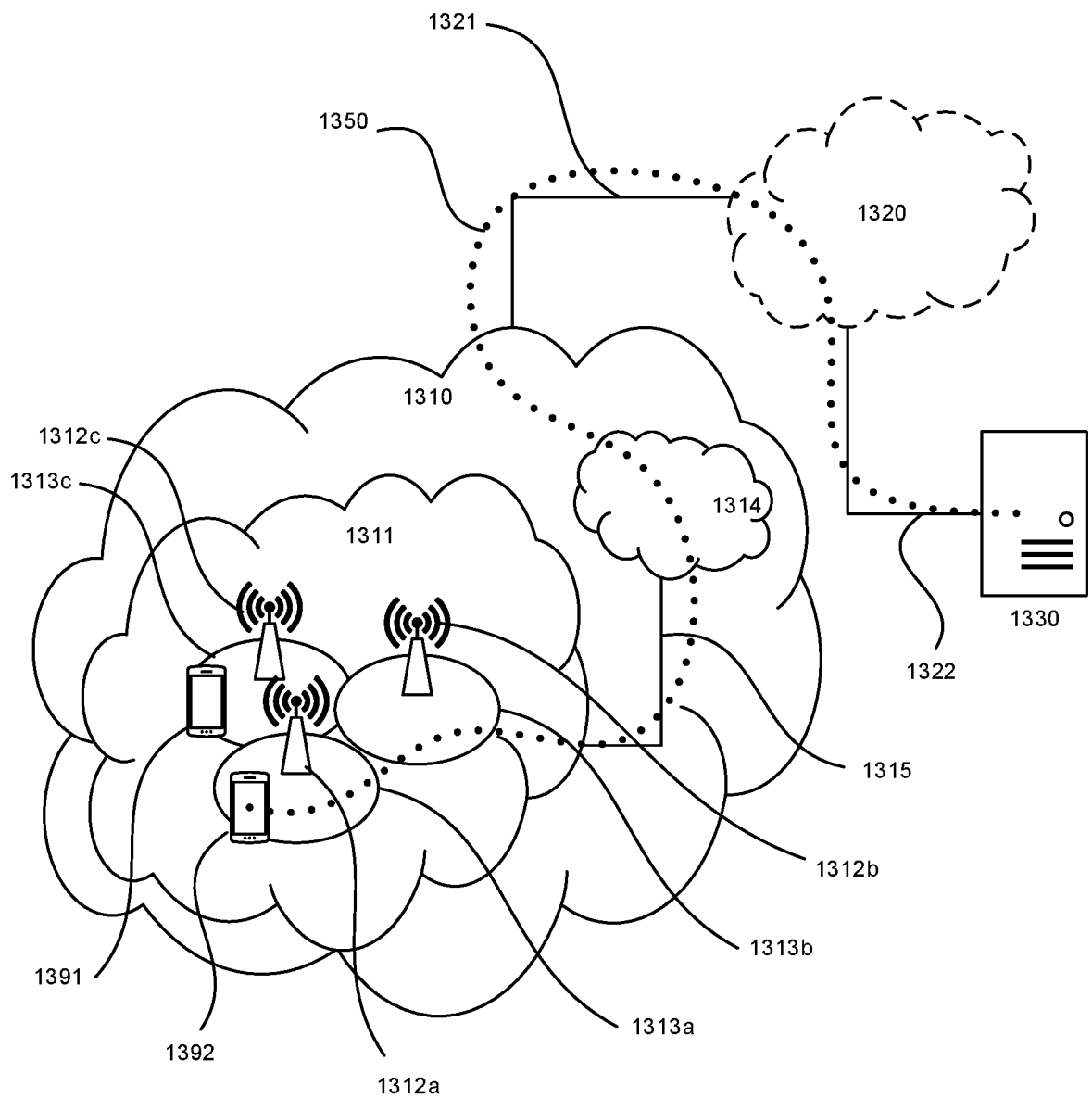
FIG. 13 is a block diagram illustrating a telecommunication network connected via an intermediate network to a host computer in accordance with some embodiments of the present disclosure.

FIG. 13 is a block diagram illustrating a telecommunication network connected via an intermediate network to a host computer in accordance with some embodiments of the present disclosure.

With reference to FIG. 13, in accordance with an embodiment, a communication system includes a telecommunication network 1310, such as a 3GPP-type cellular network, which comprises an access network 1311, such as a radio access network, and a core network 1314. The access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to the core network 1314 over a wired or wireless connection 1315. A first UE 1391 located in a coverage area 1313c is configured to wirelessly connect to, or be paged by, the corresponding base station 1312c. A second UE 1392 in a coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

The telecommunication network 1310 is itself connected to a host computer 1330, which may be embodied in the hardware and/or software of a standalone server, a cloud-implemented server, a distributed server or as processing resources in a server farm. The host computer 1330 may be under the ownership or control of a service provider, or may be operated by the service provider or on behalf of the service provider. Connections 1321 and 1322 between the telecommunication network 1310 and the host computer 1330 may extend directly from the core network 1314 to the host computer 1330 or may go via an optional intermediate network 1320. An intermediate network 1320 may be one of, or a combination of more than one of, a public, private or hosted network; the intermediate network 1320, if any, may be a backbone network or the Internet; in particular, the intermediate network 1320 may comprise two or more sub-networks (not shown).

The communication system of FIG. 13 as a whole enables connectivity between the connected UEs 1391, 1392 and the host computer 1330. The connectivity may be described as an over-the-top (OTT) connection 1350. The host computer 1330 and the connected UEs 1391, 1392 are configured to communicate data and/or signaling via the OTT connection 1350, using the access network 1311, the core network 1314, any intermediate network 1320 and possible further infrastructure (not shown) as intermediaries. The OTT connection 1350 may be transparent in the sense that the participating communication devices through which the OTT connection 1350 passes are unaware of routing of uplink and downlink communications. For example, the base station 1312 may not or need not be informed about the past routing of an incoming downlink communication with data originating from the host computer 1330 to be forwarded (e.g., handed over) to a connected UE 1391. Similarly, the base station 1312 need not be aware of the future routing of an outgoing uplink communication originating from the UE 1391 towards the host computer 1330.

Figure 14:
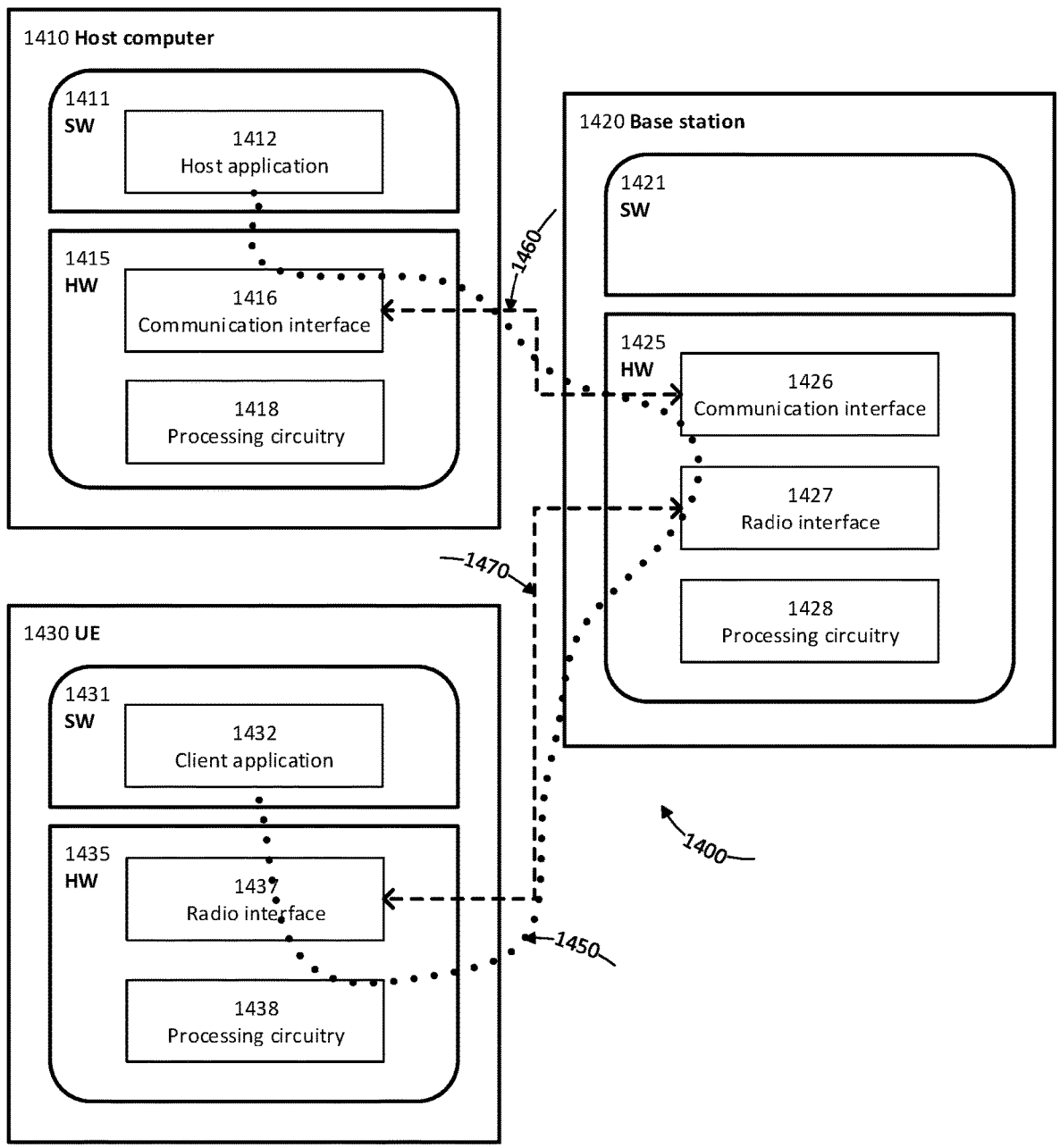
FIG. 14 is a block diagram illustrating a host computer communicating via a base station with a UE over a partially wireless connection in accordance with some embodiments of the present disclosure.

FIG. 14 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 14. In a communication system 1400, a host computer 1410 comprises hardware 1415 including a communication interface 1416 configured to set up and maintain a wired or wireless connection with an interface of a different communication device of the communication system 1400. The host computer 1410 further comprises a processing circuitry 1418, which may have storage and/or processing capabilities. In particular, the processing circuitry 1418 may comprise one or more programmable processors, application-specific integrated circuits, field programmable gate arrays or combinations of these (not shown) adapted to execute instructions. The host computer 1410 further comprises software 1411, which is stored in or accessible by the host computer 1410 and executable by the processing circuitry 1418. The software 1411 includes a host application 1412. The host application 1412 may be operable to provide a service to a remote user, such as UE 1430 connecting via an OTT connection 1450 terminating at the UE 1430 and the host computer 1410. In providing the service to the remote user, the host application 1412 may provide user data which is transmitted using the OTT connection 1450.

The communication system 1400 further includes a base station 1420 provided in a telecommunication system and comprising hardware 1425 enabling it to communicate with the host computer 1410 and with the UE 1430. The hardware 1425 may include a communication interface 1426 for setting up and maintaining a wired or wireless connection with an interface of a different communication device of the communication system 1400, as well as a radio interface 1427 for setting up and maintaining at least a wireless connection 1470 with the UE 1430 located in a coverage area (not shown in FIG. 14) served by the base station 1420. The communication interface 1426 may be configured to facilitate a connection 1460 to the host computer 1410. The connection 1460 may be direct or it may pass through a core network (not shown in FIG. 14) of the telecommunication system and/or through one or more intermediate networks outside the telecommunication system. In the embodiment shown, the hardware 1425 of the base station 1420 further includes a processing circuitry 1428, which may comprise one or more programmable processors, application-specific integrated circuits, field programmable gate arrays or combinations of these (not shown) adapted to execute instructions. The base station 1420 further has software 1421 stored internally or accessible via an external connection.

The communication system 1400 further includes the UE 1430 already referred to. Its hardware 1435 may include a radio interface 1437 configured to set up and maintain a wireless connection 1470 with a base station serving a coverage area in which the UE 1430 is currently located. The hardware 1435 of the UE 1430 further includes a processing circuitry 1438, which may comprise one or more programmable processors, application-specific integrated circuits, field programmable gate arrays or combinations of these (not shown) adapted to execute instructions. The UE 1430 further comprises software 1431, which is stored in or accessible by the UE 1430 and executable by the processing circuitry 1438. The software 1431 includes a client application 1432. The client application 1432 may be operable to provide a service to a human or non-human user via the UE 1430, with the support of the host computer 1410. In the host computer 1410, an executing host application 1412 may communicate with the executing client application 1432 via the OTT connection 1450 terminating at the UE 1430 and the host computer 1410. In providing the service to the user, the client application 1432 may receive request data from the host application 1412 and provide user data in response to the request data. The OTT connection 1450 may transfer both the request data and the user data. The client application 1432 may interact with the user to generate the user data that it provides.

It is noted that the host computer 1410, the base station 1420 and the UE 1430 illustrated in FIG. 14 may be similar or identical to the host computer 1330, one of base stations 1312*a*, 1312*b*, 1312*c* and one of UEs 1391, 1392 of FIG. 13, respectively. This is to say, the inner workings of these entities may be as shown in FIG. 14 and independently, the surrounding network topology may be that of FIG. 13.

In FIG. 14, the OTT connection 1450 has been drawn abstractly to illustrate the communication between the host computer 1410 and the UE 1430 via the base station 1420, without explicit reference to any intermediary devices and the precise routing of messages via these devices. Network infrastructure may determine the routing, which it may be configured to hide from the UE 1430 or from the service provider operating the host computer 1410, or both. While the OTT connection 1450 is active, the network infrastructure may further take decisions by which it dynamically changes the routing (e.g., on the basis of load balancing consideration or reconfiguration of the network).

Wireless connection 1470 between the UE 1430 and the base station 1420 is in accordance with the teachings of the embodiments described throughout this disclosure. One or more of the various embodiments improve the performance of OTT services provided to the UE 1430 using the OTT connection 1450, in which the wireless connection 1470 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 1450 between the host computer 1410 and the UE 1430, in response to variations in the measurement results. The measurement procedure and/or the network functionality for reconfiguring the OTT connection 1450 may be implemented in software 1411 and hardware 1415 of the host computer 1410 or in software 1431 and hardware 1435 of the UE 1430, or both. In embodiments, sensors (not shown) may be deployed in or in association with communication devices through which the OTT connection 1450 passes; the sensors may participate in the measurement procedure by supplying values of the monitored quantities exemplified above, or supplying values of other physical quantities from which the software 1411, 1431 may compute or estimate the monitored quantities. The reconfiguring of the OTT connection 1450 may include message format, retransmission settings, preferred routing etc.; the reconfiguring need not affect the base station 1420, and it may be unknown or imperceptible to the base station 1420. Such procedures and functionalities may be known and practiced in the art. In certain embodiments, measurements may involve proprietary UE signaling facilitating the host computer 1410's measurements of throughput, propagation times, latency and the like. The measurements may be implemented in that the software 1411 and 1431 causes messages to be transmitted, in particular empty or 'dummy' messages, using the OTT connection 1450 while it monitors propagation times, errors etc.

Figure 15:
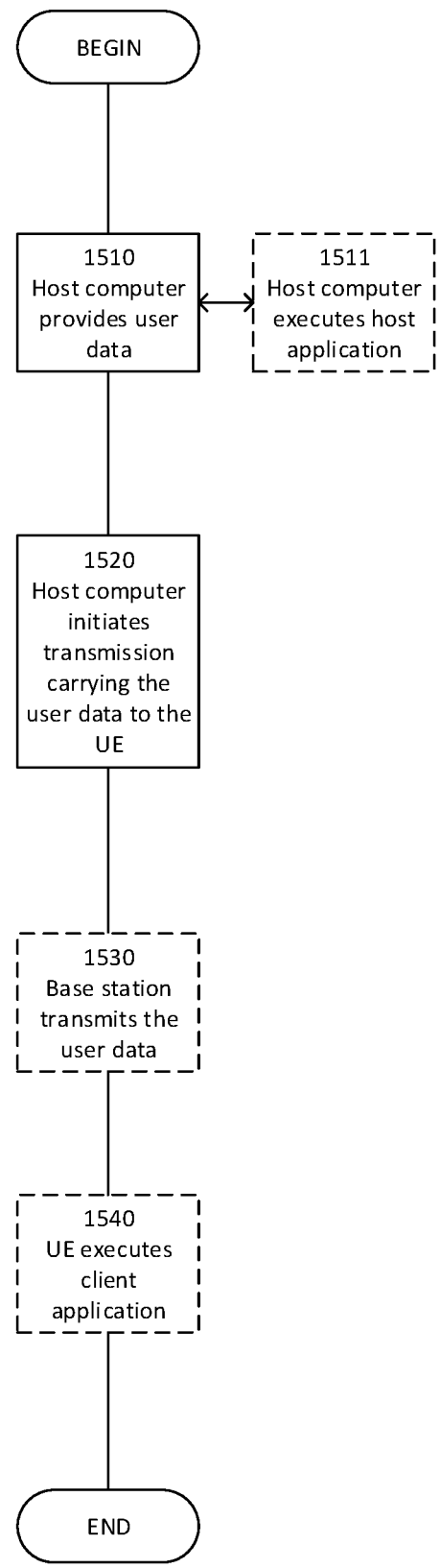
FIG. 15 is a flowchart illustrating a method implemented in a communication system, in accordance with an embodiment of the present disclosure.

FIG. 15 is a flowchart illustrating a method implemented in a communication system, in accordance with an embodiment. The communication system includes a host computer, a base station and a UE which may be those described with reference to FIG. 13 and FIG. 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 16:
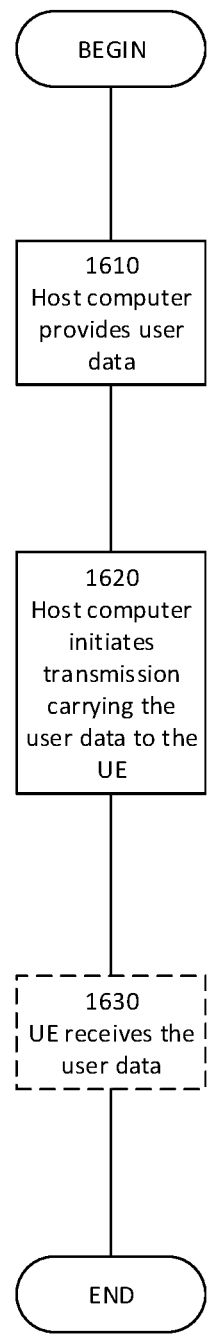
FIG. 16 is a flowchart illustrating a method implemented in a communication system, in accordance with an embodiment of the present disclosure.

FIG. 16 is a flowchart illustrating a method implemented in a communication system, in accordance with an embodiment. The communication system includes a host computer, a base station and a UE which may be those described with reference to FIG. 13 and FIG. 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
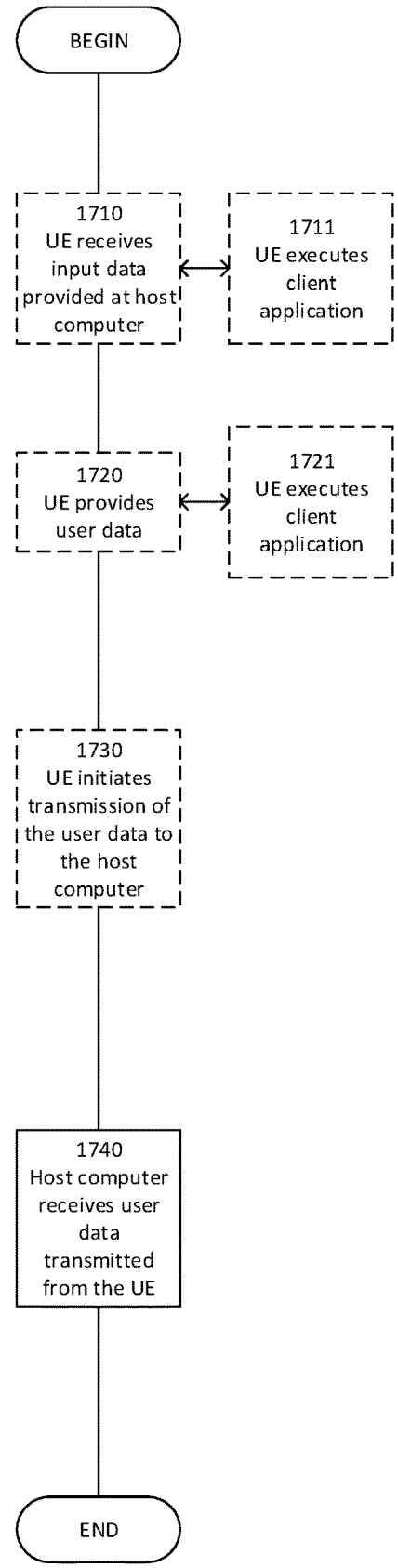
FIG. 17 is a flowchart illustrating a method implemented in a communication system, in accordance with an embodiment of the present disclosure.

FIG. 17 is a flowchart illustrating a method implemented in a communication system, in accordance with an embodiment. The communication system includes a host computer, a base station and a UE which may be those described with reference to FIG. 13 and FIG. 14. For simplicity of the present disclosure, only drawing references to FIG. 13 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 18:
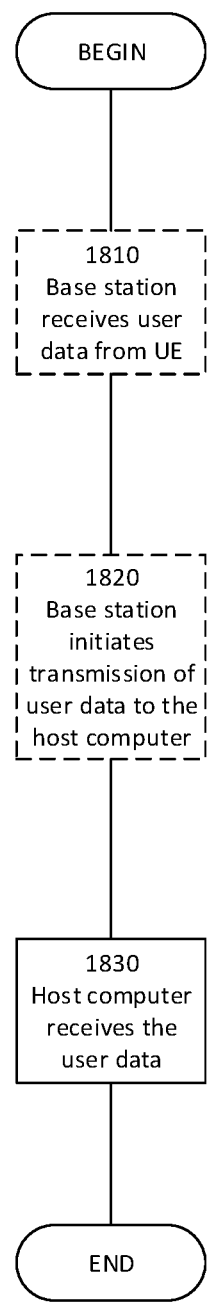
FIG. 18 is a flowchart illustrating a method implemented in a communication system, in accordance with an embodiment of the present disclosure.

FIG. 18 is a flowchart illustrating a method implemented in a communication system, in accordance with an embodiment. The communication system includes a host computer, a base station and a UE which may be those described with reference to FIG. 13 and FIG. 14. For simplicity of the present disclosure, only drawing references to FIG. 14 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method implemented at a wireless device, the method comprising:
computing an average power for a bin covering a portion of a total solid angle covered by an antenna array of the wireless device by averaging a momentary power for the bin over a time period, the momentary power is computed based on respective scheduled power of at least one beamforming transmission and respective antenna gain of the at least one beamforming transmission in the bin;
performing a back-off power feedback control for the bin based on the computed average power;
obtaining an estimated normalized power for the bin by normalizing the computed average power with a total max transmit power and a maximum beam gain; and
obtaining a total power for the bin by multiplying the estimated normalized power with a total power measured at least one power amplifier in a radio of the wireless device, the obtained total power for the bin is used for the back-off power feedback control for the bin.

2. The method according to claim 1, further comprising: generating respective beamforming weight for the at least one beamforming transmission by using codebook based beamforming or by using a solution to a reciprocity assisted optimization problem; and obtaining the respective antenna gain in the bin based on the respective beamforming weight.

3. The method according to claim 2, wherein when the codebook based beamforming is used, the respective antenna gain in the bin is obtained from a look-up-table where the respective antenna gain in the bin is precomputed and stored.

4. The method according to claim 1, wherein a scheduled power of a beamforming transmission is computed by multiplying a total transmit power without the antenna gain with a resource ratio between one or more scheduled resources used by the beamforming transmission and maximally schedulable resources.

5. The method according to claim 4, wherein the total transmit power without the antenna gain is measured before the antenna array or predicted.

6. The method according to claim 4, wherein the total transmit power without the antenna gain is predicted by using information available in a scheduler or in a base band.

7. The method according to claim 1, wherein a fraction of a gain of beam $n_w$ of a multi-user group $n_g$ that is valid in a direction given by a steering vector $a^{i,j}$ with index i, j at time t is computed as:

$$v_{i,j,n_w,n_g}(t) = \frac{\left\|(\alpha^{i,j}(t))^H w_{n_w,n_g}(t)\right\|^2}{\left\|(w_{n_w,n_g}(t))^H w_{n_w,n_g}(t)\right\|^2} G_{n_w,n_g}(t) \text{ or}$$

$$v_{i,j,n_w,n_g}(t) = \left\|(\alpha^{i,j}(t))^H w_{n_w,n_g}(t)\right\|^2$$

where $w_{n_w,n_g}$ denotes the beamforming weight of the beam $n_w$ of the multi-user group $$n_g, G_{n_w,n_g}(t) = \frac{\tilde{P}_b(t)}{\tilde{P}_c(t)}$$

denotes a power ratio between a user beam $\tilde{P}_b(t)$ and a common/control channel beam $\tilde{P}_c(t)$.

8. The method according to claim 1, further comprising: turning on the back-off power feedback control for the bin when the computed average power is greater than a first threshold; and turning off the back-off power feedback control for the bin and setting a resource threshold for the bin applied in a scheduler as the maximum value when the computed average power is smaller than a second threshold, wherein the first threshold is greater than the second threshold.

9. The method according to claim 8, wherein the first threshold is set as $\delta_1 P_{max,site}$ and the second threshold is set as $\delta_2 P_{max,site}$, where $P_{max,site}$ denotes maximal total power of a radio of the wireless device, $0 \leq \delta_2 \leq 1$ and $0 \leq \delta_1 \leq 1$.

10. The method according to claim 1, further comprising only allowing a differential control action that reduces the power of the bin.

11. The method according to claim 1, further comprising: when the computed average power is greater than a fraction of a determined maximum averaged power threshold to meet certain regulatory requirements, setting a resource threshold for the bin applied in a scheduler as minimum value.

12. The method according to claim 1, wherein performing a back-off power feedback control for the bin based on the computed average power comprises:
generating by a controller a control signal based on the computed average power and a setpoint for the average power for the bin; generating a resource threshold for the bin applied in a scheduler based on the control signal; and applying the resource threshold in the scheduler to limit a number of resources used for the bin or limit any other quantity used for the bin that correlates with the resource threshold.

13. The method according to claim 12, wherein the controller is of proportional-derivative (PD) type.

14. The method according to claim 12, wherein the setpoint is smaller than a determined maximum averaged power threshold.

15. The method according to claim 1, wherein the wireless device comprises a base station.

16. The method according to claim 1, wherein the wireless device is equipped with advanced antenna systems (AAS).

17. An apparatus implemented at a wireless device, comprising:
a processor; and
a memory coupled to the processor, the memory containing instructions
executable by the processor, to cause the apparatus to:
compute an average power for a bin covering a portion of a total solid angle covered by an antenna array of the wireless device by averaging a momentary power for the bin over a time period, the momentary power is computed based on respective scheduled power of at least one beamforming transmission and respective antenna gain of the at least one beamforming transmission in the bin;
perform a back-off power feedback control for the bin based on the computed average power;
obtain an estimated normalized power for the bin by normalizing the computed average power with a total max transmit power and a maximum beam gain; and
obtain a total power for the bin by multiplying the estimated normalized power with a total power measured at least one power amplifier in a radio of the wireless device, the obtained total power for the bin is used for the back-off power feedback control for the bin.

* * * * *